(12) United States Patent
Chandler et al.

(10) Patent No.: US 11,717,110 B1
(45) Date of Patent: Aug. 8, 2023

(54) EXTENDABLE ROASTING APPARATUS

(71) Applicants: Kimberly Chandler, Spring, TX (US);
Guy Chandler, Spring, TX (US)

(72) Inventors: Kimberly Chandler, Spring, TX (US);
Guy Chandler, Spring, TX (US)

( * ) Notice: Subject to any disclaimer, the term of this patent is extended or adjusted under 35 U.S.C. 154(b) by 1,167 days.

(21) Appl. No.: 16/240,413

(22) Filed: Jan. 4, 2019

(51) Int. Cl.
| | |
|---|---|
| *A47J 37/04* | (2006.01) |
| *A47J 37/07* | (2006.01) |
| *A47J 43/18* | (2006.01) |
| *A22C 17/00* | (2006.01) |
| *A47J 43/28* | (2006.01) |

(52) U.S. Cl.
CPC ........... *A47J 37/0786* (2013.01); *A47J 37/04* (2013.01); *A47J 37/049* (2013.01); *A47J 43/18* (2013.01); *A22C 17/006* (2013.01); *A47J 43/281* (2013.01); *A47J 2037/0795* (2013.01)

(58) Field of Classification Search
CPC ................................ A47J 37/04; A47J 37/049
USPC ................................. 99/419, 421 A, 421 HH
See application file for complete search history.

(56) References Cited

U.S. PATENT DOCUMENTS

| | | | | |
|---|---|---|---|---|
| 1,755,646 | A * | 4/1930 | Halstead | A47J 37/04 30/151 |
| 3,927,609 | A * | 12/1975 | Scott | A47J 43/18 99/419 |
| 4,539,751 | A * | 9/1985 | Chan | A47J 43/283 99/421 A |
| 6,957,492 | B1* | 10/2005 | Westfall | A47J 43/288 30/151 |
| 2015/0110939 | A1* | 4/2015 | Benson et al. | A47J 43/288 99/421 A |
| 2016/0174760 | A1* | 6/2016 | Criner | A47J 33/00 99/421 A |

* cited by examiner

*Primary Examiner* — Reginald Alexander
(74) *Attorney, Agent, or Firm* — Law Office of Jeff Williams PLLC; J. Oliver Williams; Andrew Rodionov

(57) ABSTRACT

A roasting assembly is presented herein, configured to accept a removable food support. The assembly includes an elongated shaft, a handle, and a socket. The elongated shaft includes a first end and a second end. The handle is coupled the first end of the elongated shaft. The socket is coupled to the second end of the elongated shaft and comprises a hollow portion axially opposite the elongated shaft. The hollow portion of the socket accepts a removable food support.

16 Claims, 6 Drawing Sheets

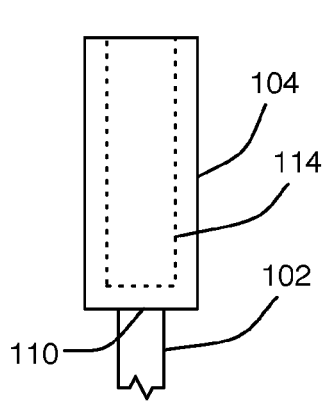
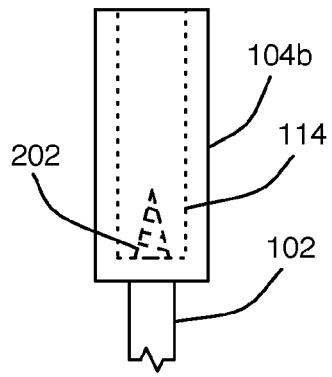
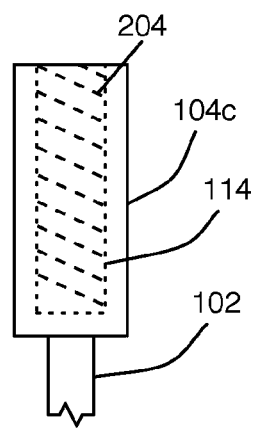
FIGURE 2A  FIGURE 2B  FIGURE 2C
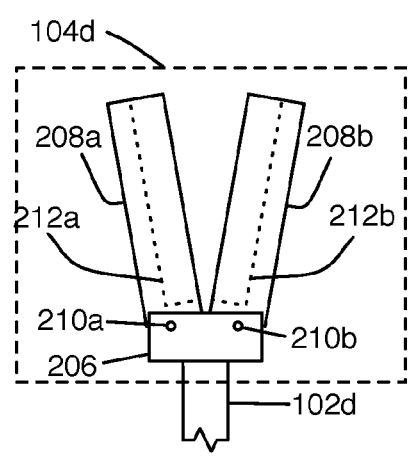
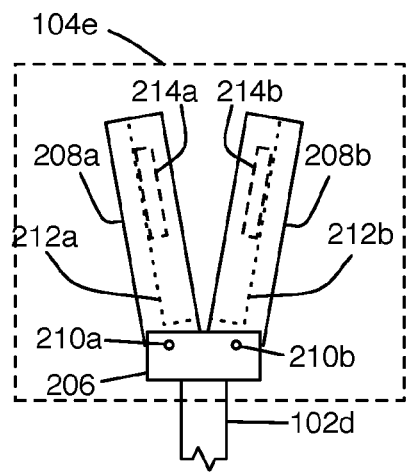
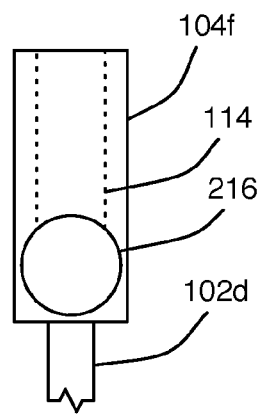
FIGURE 2D  FIGURE 2E  FIGURE 2F
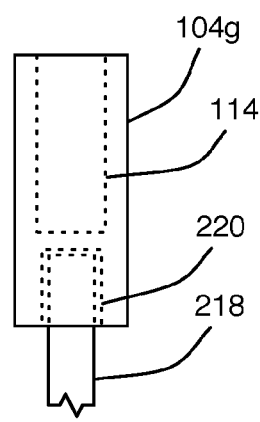
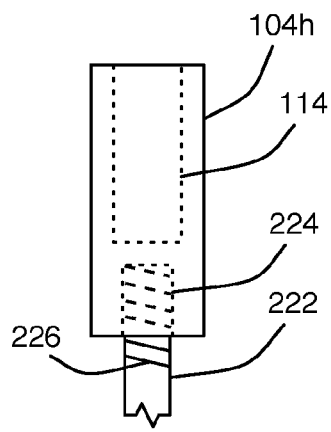
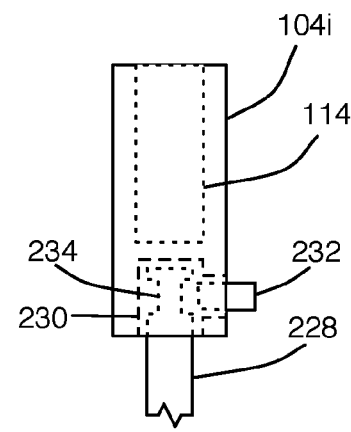
FIGURE 2G  FIGURE 2H  FIGURE 2I

EXTENDABLE ROASTING APPARATUS

BACKGROUND

1. Field of the Invention

The present application relates to a cooking utensil, and more particularly to a roasting apparatus for open fire cooking configured to accept an interchangeable food support.

2. Description of Related Art

Roasting food over a fire using a hand-held roasting stick to support the food is an activity enjoyed by young and old alike. Foods such as hot dogs, small pieces of meat or marshmallows are all easy to roast. However, cleaning the stick for the next food may be troublesome. For example, roasted marshmallows leave a sticky residue on the stick that may be objectionable when next roasting a hot dog. Also, sticks of a suitable length or diameter may not be available. A short stick may necessitate the user being too close to the fire for comfort. A small diameter stick may result in the food bouncing up and down into the ashes. A large diameter stick may be too large to skewer the food item.

Although strides have been made to provide a better manner of roasting food over a fire, shortcomings remain. It is desired that an assembly be provided that is extendable, reusable, and accepts appropriately sized, disposable food supports.

SUMMARY OF THE INVENTION

It is an object of the present application to provide an extendable roasting apparatus for cooking food over a fire. The apparatus is adjustable to a convenient length, reusable, and accepts food supports to hold the food over the fire. The food supports may be removed for easy cleanup or disposal in the trash. This assembly is ideally suited for roasting food over an outdoor while on a picnic or campout.

It is a further object of the present application that the assembly length be adjustable. Furthermore, the assembly may be collapsed to a convenient length for transport.

A roasting assembly comprises an elongated shaft having a first end and a second end, a handle coupled to the first end of the elongated shaft, and a socket coupled to the second end of the elongated shaft. The socket includes an externally accessible hollowed portion accessible opposite the elongated shaft.

A distance between the first end and the second end of the elongated shaft may be selectively adjusted. The elongated shaft may adjust length telescopically. The elongated shaft may further comprise a first shaft segment and a second shaft segment, wherein the first shaft segment is at least partially hollow having transverse inside dimensions that are greater than the transverse outside dimensions of the second shaft segment, such that the second shaft segment may move axially inside the first shaft segment.

The socket may further feature the ability to adjust to various sized food supports inserted therein. The socket may comprise a screw thread, for example, located within in the hollow portion of the socket. The screw thread may be located on an inside wall of the hollow portion of the socket and selectively protrude into the hollow portion to secure the food support.

The socket may alternatively comprise a base coupled to the elongated shaft and a plurality of longitudinal segments that pivot relative to the base, wherein the plurality of longitudinal segments couple to the base to form the hollow portion of the socket.

The assembly may further comprise a food support, wherein the food support is removably coupled to the socket. The food support may comprise a single extension protruding away from the socket. Alternatively, the food support may comprise a plurality of extensions protruding away from the socket. Alternatively, the food support may comprise a spoon.

The socket may be detachable from the elongated shaft.

In an alternative embodiment, the roasting apparatus comprises an elongated shaft including a first end and a second end, a food support and a socket coupled to the second end of the elongated shaft. The socket comprises a hollow portion and an external opening to the hollow portion located axially opposite the elongated shaft, wherein the food support is removably coupled to the hollow portion of the socket through the external opening of the socket. The apparatus may further comprise a handle coupled to the first end of the elongated shaft. The food support may be disposable. The apparatus may further comprise a linkage coupled to the second end of the shaft, and a motor coupled to the linkage, wherein the motor adjusts the extended shaft length telescopically.

Ultimately the invention may take many embodiments but features convenient length, reusability, and accepts food supports to hold the food over the fire. The food supports may be removed for easy cleanup or be disposed of. In this way, this assembly overcomes the disadvantages inherent in the prior art.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 2A is a side view of a socket embodiment for friction coupling a food support to the socket in the extendable roasting apparatus of FIG. 1.

FIG. 2B is a side view of a socket embodiment for threaded screw point coupling a food support to the socket in the extendable roasting apparatus of FIG. 1.

FIG. 2C is a side view of a socket embodiment for threaded coupling a food support to the socket in the extendable roasting apparatus of FIG. 1.

FIG. 2D is a side view of a socket embodiment for friction coupling a food support to the socket using a plurality of longitudinal segments in the extendable roasting apparatus of FIG. 1.

FIG. 2E is a side view of a socket embodiment for grabber coupling a food support to the socket using a plurality of longitudinal segments in the extendable roasting apparatus of FIG. 1.

FIG. 2F is a side view of a socket embodiment for friction coupling a food support to the socket using a pushbutton to eject the food support in the extendable roasting apparatus of FIG. 1.

FIG. 2G is a side view of a socket embodiment for friction coupling a socket to an elongated shaft in the extendable roasting apparatus of FIG. 1.

FIG. 2H is a side view of a socket embodiment for threaded coupling a socket to an elongated shaft in the extendable roasting apparatus of FIG. 1.

FIG. 2I is a side view of a socket embodiment for set screw coupling a socket to an elongated shaft in the extendable roasting apparatus of FIG. 1.

DETAILED DESCRIPTION OF THE PREFERRED EMBODIMENT

Figure 1:
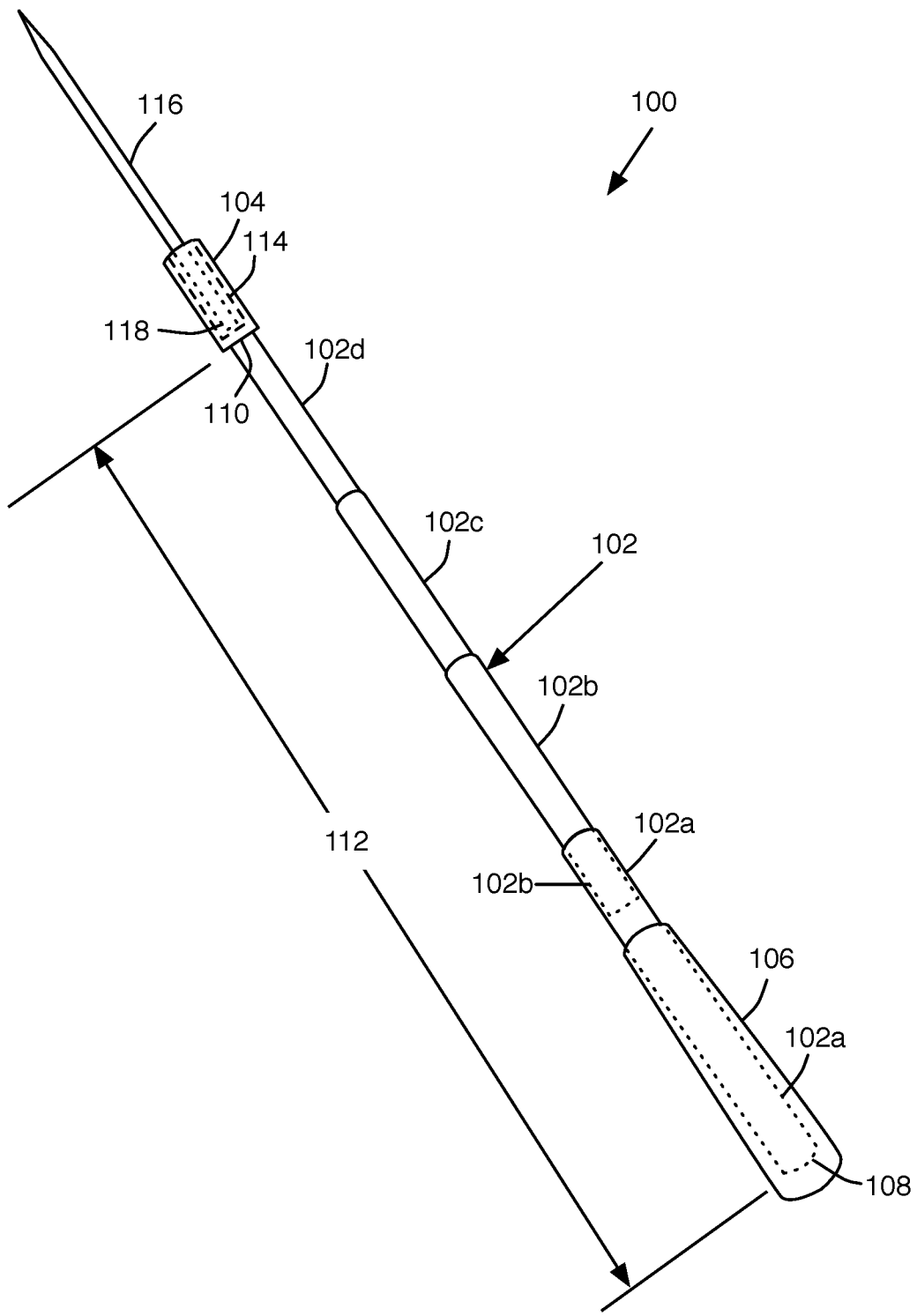
FIG. 1 is a perspective view of an extendable roasting apparatus according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated handheld roasting sticks discussed previously. In particular, the assembly uses disposable food supports which are appropriately sized for the food being roasted. The assembly is extendable, allowing the user to adjust the length of the assembly to suit the user's comfort level near the fire. The assembly is also reusable. These and other unique features of the assembly are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the present invention and method of use are herein described. It should be noted that the articles "a", "an", and "the", as used in this specification, include plural referents unless the content clearly dictates otherwise.

Referring now to FIG. 1, a perspective view of a roasting assembly 100 is illustrated. Assembly 100 comprises an elongated shaft 102, a socket 104 and a handle 106. Elongated shaft 102 comprises a first end 108 and a second end 110. An elongated shaft length 112, a distance between the first end 108 and second end 110 of elongated shaft 102, may be selectively adjusted.

The handle 106 is coupled to the first end 108 of the elongated shaft. Handle 106 configures apparatus 100 to be easily handled by the user. Handle 108 may also insulate the user's hand from heat absorbed by the apparatus during use. Examples of handle 108 may include wood with finger grips carved into the wood, neoprene, or rubber. Other types of handles may be used, which are known.

Elongated shaft 102 comprises a plurality of shaft segments: a first shaft segment 102a, a second shaft segment 102b, a third shaft segment 102c, and a fourth shaft segment 102d. The first shaft segment 102a comprises an at least partially hollow section with transverse inside dimensions greater than the corresponding transverse outside dimensions of the second shaft segment 102b, allowing the second shaft segment 102b to move axially, or telescope, inside the first shaft segment 102a. Similarly, the second shaft segment 102b comprises an at least partially hollow section with transverse inside dimensions greater than the corresponding transverse outside dimensions of the third shaft segment 102c. Similarly, the third shaft segment 102c comprises an at least partially hollow section with transverse inside dimensions greater than the corresponding transverse outside dimensions of the fourth shaft segment 102d. The number of shaft segments may be more or less than those shown, as determined by one skilled in the art based on design requirements such as maximum and minimum length of apparatus 100, or strength and composition of the elongated shaft 102. When elongated shaft length 112 is adjusted to minimum length, apparatus 100 is conveniently portable.

The shaft segments 102a-102d are shown having a cylindrical shape. As such, an inside diameter of first shaft segment 102a is greater than an outside diameter of second shaft segment 102b, allowing the second shaft segment 102b to move axially inside, or telescope within, the first shaft segment 102a. It is understood that other transverse shapes of shaft 102 may be chosen, examples include square, hexagonal, or oval, as aesthetics or material availability may dictate.

Socket 104 is coupled to the second end 110 of elongated shaft 102. Socket 104 may be permanently coupled to second end 110 of elongated shaft 102 or may be removably coupled, as is shown later. Referring now also to FIG. 2A, socket 104 comprises an externally accessible hollowed portion 114, which is accessible opposite the elongated shaft 102.

Roasting assembly 100 may further comprise a food support 116. Food support 116 may be removably coupled to socket 104. Food support 116 comprises a socket end 118. Coupling food support 116 to socket 104 is accomplished by inserting the socket end 118 into the externally accessible hollowed portion 114 of socket 104. The socket end 118 is dimensioned for a friction fit with hollowed portion 114.

Other means of coupling food support 116 to socket 104 may be contemplated. Referring now to FIG. 2B, socket 104b comprises externally accessible hollowed portion 114 and a threaded screw point 202. Threaded screw point 202 is located inside the hollowed portion 114 closest to elongated shaft 102. As the socket end 118 of food support 116 is inserted into hollowed portion 114, when the socket end hits the threaded screw point 202, food support 116 is twisted to allow socket end 118 engage with the threaded screw point 202.

Referring now to FIG. 2C, socket 104c comprises externally accessible hollowed portion 114 and screw threads 204. Screw threads 204 are located on the surface of the externally accessible hollowed portion 114. As the socket end 118 of food support 116 is inserted into hollowed portion 114, food support 116 is twisted to engage screw threads 204.

Referring now to FIG. 2D, socket 104d comprises a base 206, a first longitudinal segment 208a, and a second longitudinal segment 208b. The base 206 is coupled to elongated shaft 102d. Base 206 comprises a first pivot 210a and a second pivot 210b. First pivot 210a couples first longitudinal segment 208a to base 206. Likewise, second pivot 210b couples second longitudinal segment 208b to base 206. First longitudinal segment 208a comprises a wall 212a. Second longitudinal segment 208b comprises a wall 212b. Longitudinal segments 208a and 208b are located on base 206 opposite elongated shaft 102 and are configured to rotate on pivots 210a and 210b to come together forming an externally accessible hollow portion of socket 104d as defined by walls 212a and 212b.

Referring now to FIG. 2E, socket 104e is similar to that of socket 104d of FIG. 2D. The first longitudinal segment 208a further comprises a grabber 214a and the second longitudinal segment 208b further comprises a grabber 214b. Grabbers 214a and 214b are located on inside walls 212a and 212b respectively. Grabbers 214a and 214b may comprise high friction strips meant to enhance holding friction, examples of which may include rubber, sandpaper, or silicone. Grabbers 214a and 214b may alternatively comprise projections that dig into the food support 116 when first and second longitudinal segments 208a and 208b come together, examples of which may include teeth, thin projections, or bumps.

Referring now to FIG. 2F, socket 104f is similar to that of socket 104 of FIG. 2A. The socket 104f further comprises a pushbutton 216, configured to uncouple food support 116 from socket 104f.

Permanent coupling of socket 104 to elongated shaft 102 may be utilized. Examples of permanent coupling may include a welded joint, an epoxy joint or a crimped joint.

Removable coupling of socket 104 to elongated shaft 102 may also be utilized with the roasting apparatus. Multiple sockets may be configured for to match the socket end 118 of food support 116 of various dimensions.

Referring now to FIG. 2G, socket 104g is removably coupled to an elongated shaft 218. Socket 104g comprises an additional hollow space 220 opening externally toward elongated shaft 218. A portion of shaft 218 inserted into additional hollow space 220 is dimensioned for a press fit with elongated shaft 218.

Referring now to FIG. 2H, socket 104h is removably coupled to an elongated shaft 222. Socket 104h comprises an internally threaded hollow space 224 having an external opening, the external opening facing elongated shaft 222. Elongated shaft 222 comprises external threads 226 that are complementary to the threads of the internally threaded hollow space 224. The removable coupling of socket 104h to elongated shaft 222 may be performed by rotating socket 104h while internally threaded hollow space 224 is in contact with the external threads 226 of elongated shaft 222.

Referring now to FIG. 2I, socket 104i is removably coupled to an elongated shaft 228. Socket 104i comprises an additional hollow space 230 having an axial external opening facing toward elongated shaft 228 and a transverse external opening. Socket 104i further comprises a set screw 232 threaded into the transverse external opening. The coupling of socket 104i to elongated shaft 228 may be performed by inserting an end of elongated shaft 228 into the axial external opening of additional hollow space 230 and turning set screw 232 to press against elongated shaft 228. Elongated shaft 228 may also comprise a groove 234 running around the circumference of an end of elongated shaft 228, groove 234 being configured to accept set screw 232. Set screw 232 may be advanced to fit into groove 234 thereby coupling socket 104i to elongated shaft 228.

Figure 3A:
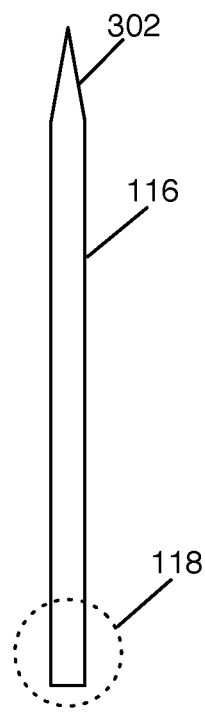
FIG. 3A is a side view of a single extension embodiment of a food support of the extendable roasting apparatus of FIG. 1.

Referring now to FIGS. 1 and 3A, food support 116 is shown coupled to socket 104. Food support 116 further comprises a pointed end 302. Socket end 118 is inserted into the hollow space opposite the elongated shaft of socket 114. The pointed end 302 may be used to be inserted through food to hold the food to the food support 116.

Figure 3B:
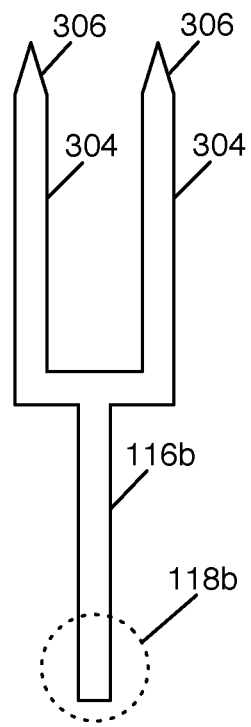
FIG. 3B is a side view of an exemplary multiple extension embodiment of a food support of the extendable roasting apparatus of FIG. 1.

Referring now to FIG. 3B, food support 116b comprises first extension 304, a second extension 308 and a socket end 118. First extension 304 includes a pointed end 306 and second extension 308 includes a pointed end 310. An example of the use of food support 116b is skewering a first food with the pointed end 306 of extension 304 and a second food with pointed end 310 of extension 308, and roasting the first and second foods at the same time. Another example of the use of food support 116b is skewering a single food item using both pointed ends 306 and 310, allowing greater stability while roasting the single food item. The number of extensions of a food support is not limited to two.

Figure 3C:
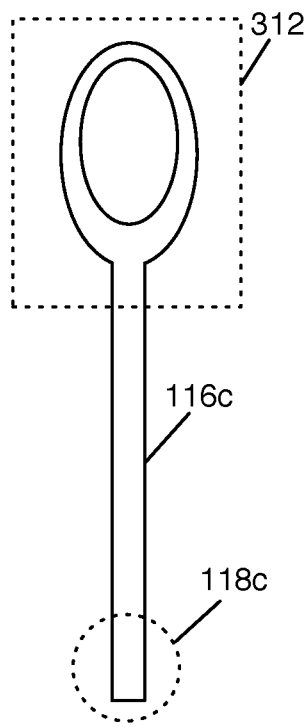
FIG. 3C is a side view of a spoon embodiment of a food support of the extendable roasting apparatus of FIG. 1.

Referring now to FIG. 3C, food support 116c comprises a spoon 312 and a socket end 118c coupled together. An example of a use of food support 116c includes stirring the contents of a pot over a fire from a distance. Another example of the use of food support 116c is sampling the contents of a pot over a fire.

Figure 3D:
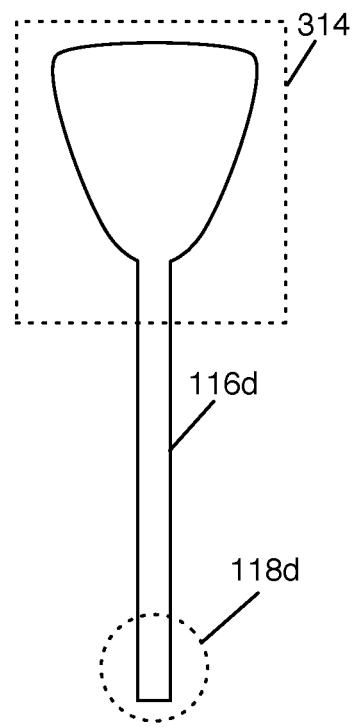
FIG. 3D is a side view of a spatula embodiment of a food support of the extendable roasting apparatus of FIG. 1.

Referring now to FIG. 3D, food support 116d comprises a spatula 314 and a socket end 118d coupled together. An example of a use of food support 116d includes flipping the contents of a food over a fire from a distance. Another example of the use of food support 116d is removing the contents of food from over the fire from a distance.

Figure 4:
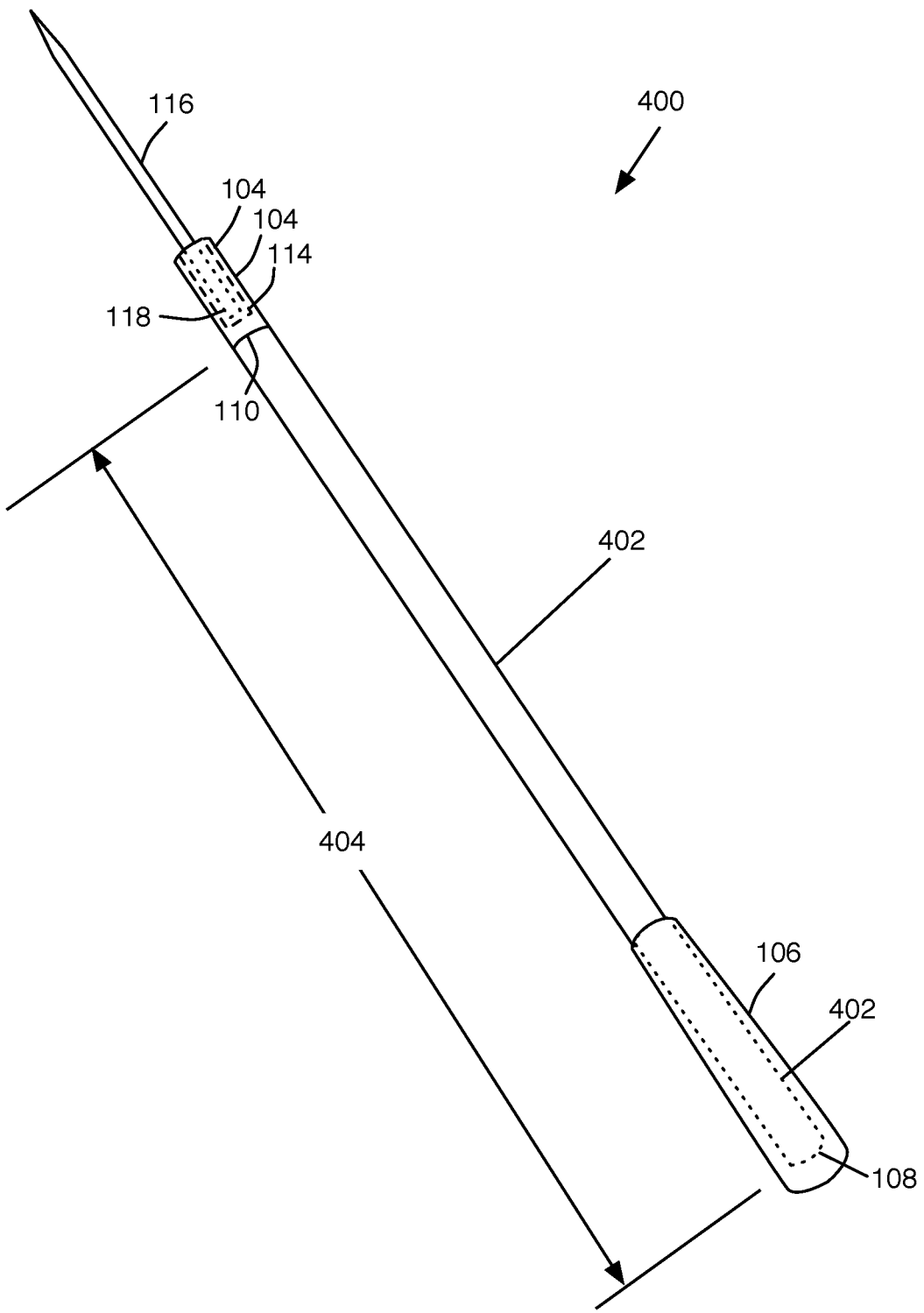
FIG. 4 is a perspective view of an alternate embodiment of the extendable roasting apparatus of FIG. 1 using an elongated shaft of fixed length.

Referring now also to FIG. 4 in the drawings, a perspective view of an alternate embodiment roasting assembly 400 is shown. Assembly 400 is similar in form and function to that of assembly 100 except as noted herein. Elongated shaft 402 has a fixed length in assembly 400 as opposed to the adjustable length shaft 102 in assembly 100.

Figure 5:
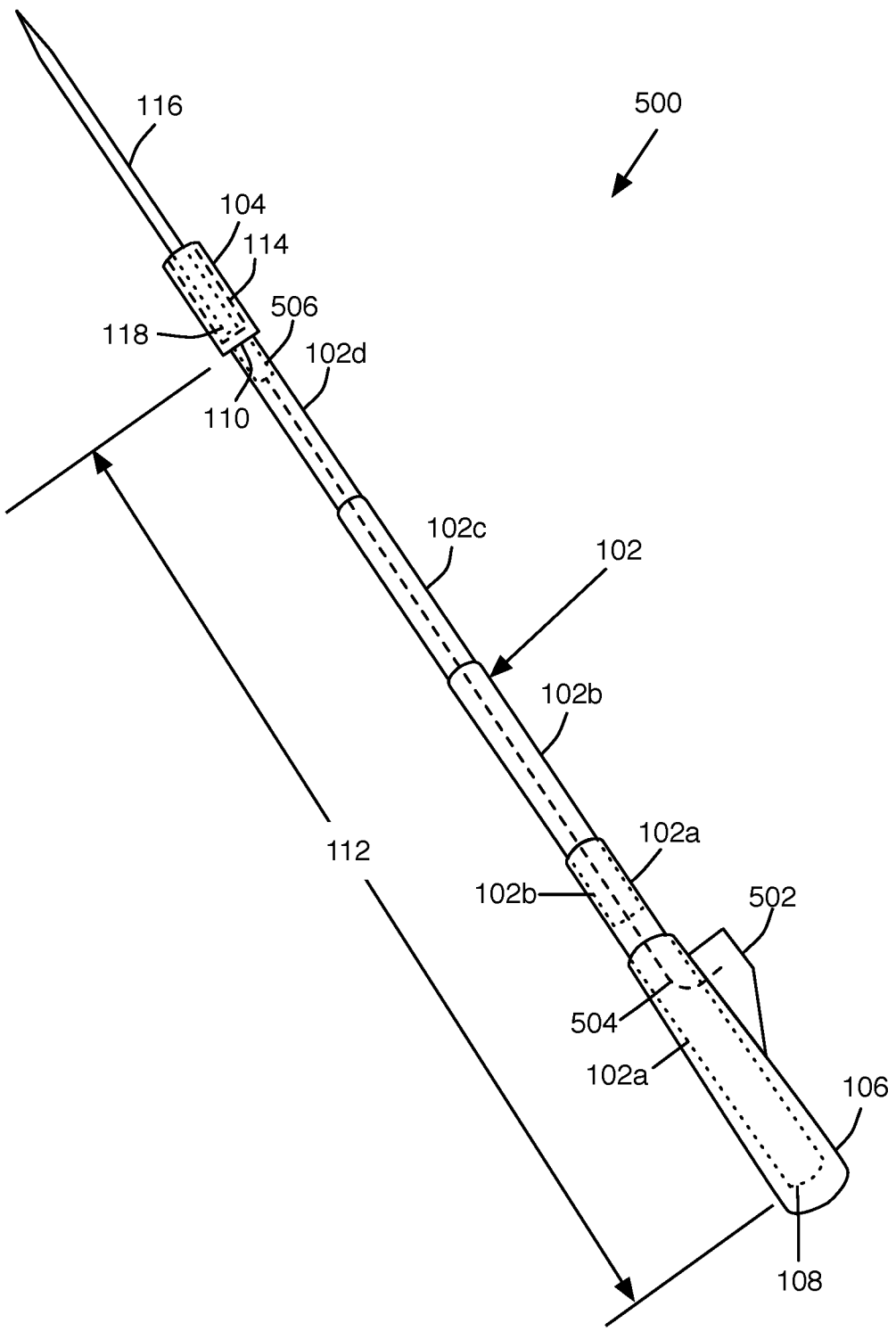
FIG. 5 is a perspective view of an alternate embodiment of the extendable roasting apparatus of FIG. 1 using an extension module to adjust the length of the elongated shaft.

Referring now also to FIG. 5 in the drawings, a perspective view of another alternate embodiment of the roasting assembly 100 is shown. Roasting assembly 500 is similar in form and function to that of assembly 100 except as noted herein. Assembly 500 further comprises an extension module 502, linkage 504 and linkage coupling 506. Extension module 502 is coupled to elongated shaft 102. Linkage 504 extends from extension module 502 through a hole (not shown) into elongated shaft 102 to linkage coupling 506. Linkage coupling 506 couples the second end 110 of elongated shaft 102 to linkage 504. Extension module 502 causes linkage 504 to go into or retract from elongated shaft 102 to cause elongated shaft length 112 to alter. Examples of linkage 504 include a stiff wire or a cord. A suitable linkage may be determined by one skilled in the art.

Figure 6:
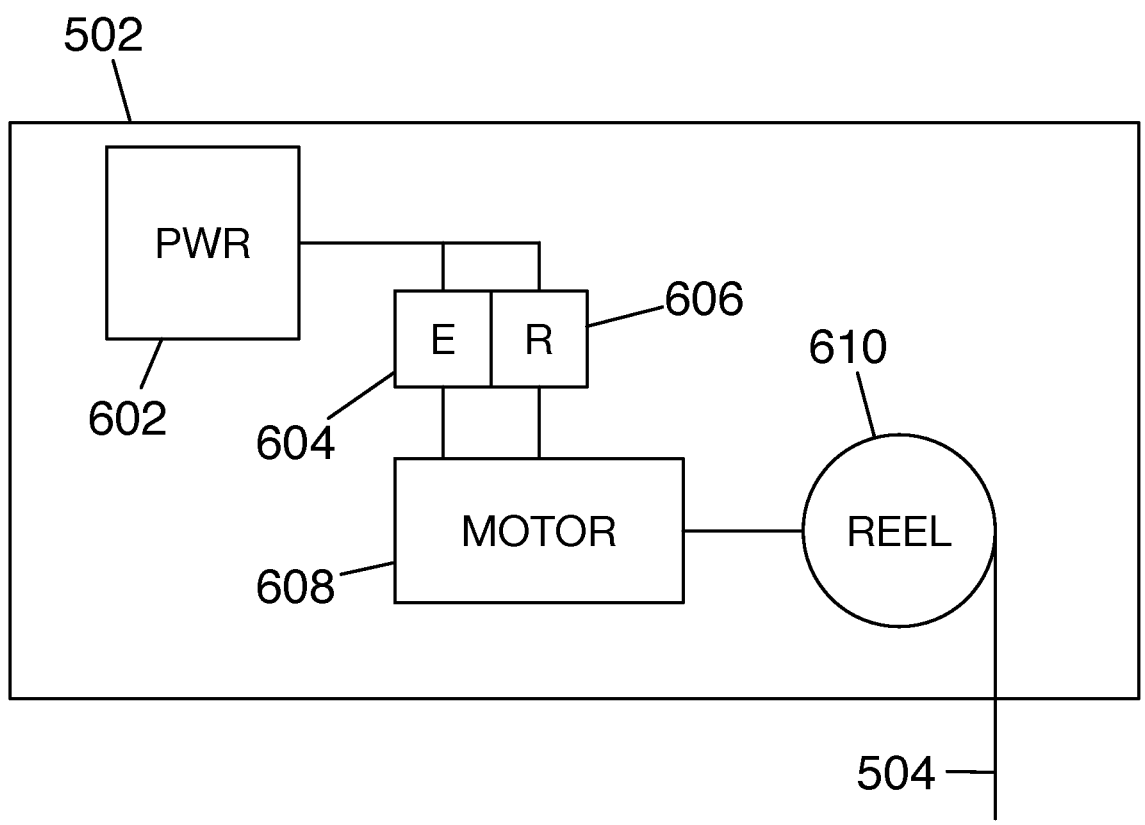
FIG. 6 is a block diagram of the extension module of FIG. 5.

Referring now to FIG. 6, a block diagram of extension module 502 is shown. Extension module 502 comprises a power source 602, an extend switch 604, a retract switch 606, a reversible motor 608 and a reel 610. Power source 602 is electrically coupled to extend switch 604 and retract switch 606. Extend switch 604 and retract switch 606 are momentary switches mechanically coupled to each other such that the extend switch 604 and the retract switch 606 are not closed at the same time. Extend switch 604 is electrically coupled to reversible motor 608 to cause the motor 608 to rotate in a clockwise direction. Retract switch 606 is electrically coupled to reversible motor 608 to cause motor 608 to rotate in a counter-clockwise direction. Reversible motor 608 is mechanically coupled to reel 610 around which linkage 504 is wound. When extend switch 604 is closed, motor 608 and reel 610 turn clockwise, reel 610 extends linkage 504. When retract switch 606 is closed, motor 608 and reel 610 turn counter-clockwise, reel 610 retracts linkage 504.

The operating directions cited describing reversible motor 608 and reel 610 are exemplary and may differ depending on the mechanical coupling of reversible motor 608 to reel 610 and the type of linkage 504 used. Referring now also to FIG. 5, closing extend switch 604 causes the elongated shaft length 112 to increase until elongated shaft 102 is fully extended. Closing retract switch 606 causes the elongated shaft length 112 to decrease until elongated shaft 102 is fully retracted.

Other methods of extending and retracting elongated shaft 102 are known and may be used by one skilled in the art.

The current application has many advantages over the prior art including at least the following: (1) comfortable length while roasting; (2) reusability; (3) easy cleanup; and (4) portability when not in use.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:
1. A roasting assembly, comprising:
    an elongated shaft comprising:
        a first end; and
        a second end;
    a handle coupled to the first end of the elongated shaft;
    a socket coupled to the second end of the elongated shaft, the socket includes:
        an externally accessible hollowed portion accessible opposite the elongated shaft;
        a base coupled to the elongated shaft; and
        a plurality of longitudinal segments that pivot relative to the base,
    wherein the plurality of longitudinal segments couple to the base to form the hollow portion of the socket.
2. The assembly of claim 1, wherein a distance between the first end and the second end of the elongated shaft may be selectively adjusted.
3. The assembly of claim 2, wherein the elongated shaft adjusts length telescopically.

4. The assembly of claim 3, the elongated shaft further comprising:
a first shaft segment; and
a second shaft segment;
wherein the first shaft segment is at least partially hollow having transverse inside dimensions that are greater than the transverse outside dimensions of the second shaft segment, such that the second shaft segment may move axially inside the first shaft segment.

5. The assembly of claim 1, the socket further comprising:
a screw thread located within in the hollow portion of the socket.

6. The assembly of claim 5, wherein the screw thread is located on an inside wall of the hollow portion of the socket.

7. The assembly of claim 1, further comprising:
a food support;
wherein the food support is removably coupled to the socket.

8. The assembly of claim 7, wherein the food support comprises:
a single extension, the extension protruding away from the socket.

9. The assembly of claim 7, wherein the food support comprises:
a plurality of extensions protruding away from the socket.

10. The assembly of claim 7, wherein the food support comprises:
a spoon.

11. The assembly of claim 1, wherein the socket is detachable from the elongated shaft.

12. A roasting apparatus, comprising:
an elongated shaft comprising:
a first end; and
a second end;
a food support;
a socket coupled to the second end of the elongated shaft, the socket comprising:
a hollow portion;
an external opening to the hollow portion located axially opposite the elongated shaft, wherein the extended shaft adjusts length telescopically;
a linkage coupled to the second end of the extended shaft; and a motor coupled to the linkage;
wherein the motor adjusts the extended shaft length telescopically; and
wherein the food support is removably coupled to the hollow portion of the socket through the external opening of the socket.

13. The apparatus of claim 12, further comprising:
a handle coupled to the first end of the elongated shaft.

14. The apparatus of claim 12, the food support comprising an extension with a pointed end, the pointed end opposite the socket.

15. The apparatus of claim 12, wherein the food support is disposable.

16. The apparatus of claim 12, wherein the socket is removably coupled to the elongated shaft.

\* \* \* \* \*